April 8, 1930.   G. J. MEUER   1,753,347

LOCKING DEVICE FOR AUTOMOTIVE VEHICLES AND THE LIKE

Filed March 1, 1924

INVENTOR
George J. Meuer
BY
ATTORNEY

Patented Apr. 8, 1930

1,753,347

UNITED STATES PATENT OFFICE

GEORGE J. MEUER, OF MILWAUKEE, WISCONSIN, ASSIGNOR, BY MESNE ASSIGNMENTS, TO CUTLER-HAMMER, INC., A CORPORATION OF DELAWARE

LOCKING DEVICE FOR AUTOMOTIVE VEHICLES AND THE LIKE

Application filed March 1, 1924. Serial No. 696,160.

This invention relates to locking devices for automotive vehicles and the like, and more particularly to a combined steering gear and ignition lock.

One object of the invention is to provide a device as aforecharacterized providing improved correlation of action of the several parts.

Another object is to provide a device of the above character adapted to delay operation of the ignition switch pending given positioning of the steering gear latch.

Another object is to provide means for maintaining the movable contacts of the ignition switch stationary through a predetermined range of movement of the latch operating means to thereby afford more accurate calibration than has heretofore been possible in such devices.

Another object is to insure locking positioning of the steering gear latch prior to opening of the ignition switch, and to insure unlocking positioning of the steering gear latch prior to closing of said switch.

Another object is to provide a device of the aforementioned character having parts so arranged that ordinary inaccuracies in manufacture will have little or no effect upon the calibrated operation thereof.

Other objects and advantages will hereinafter appear.

Figure 1:
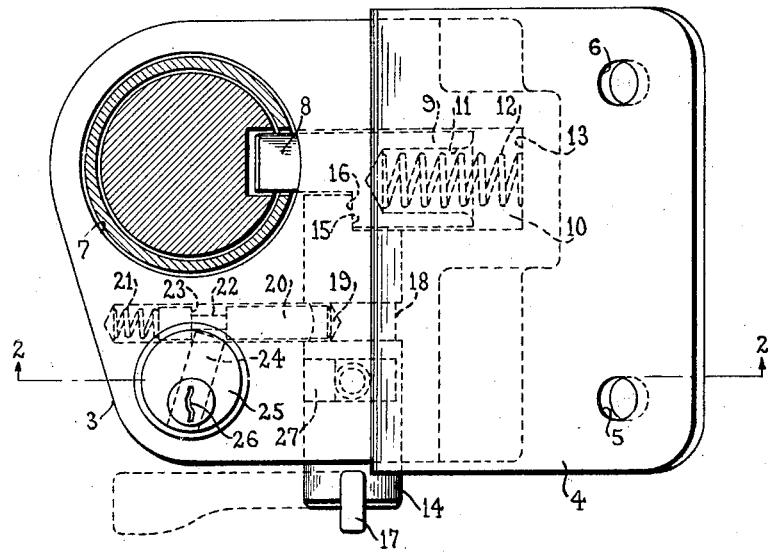
Figure 2:
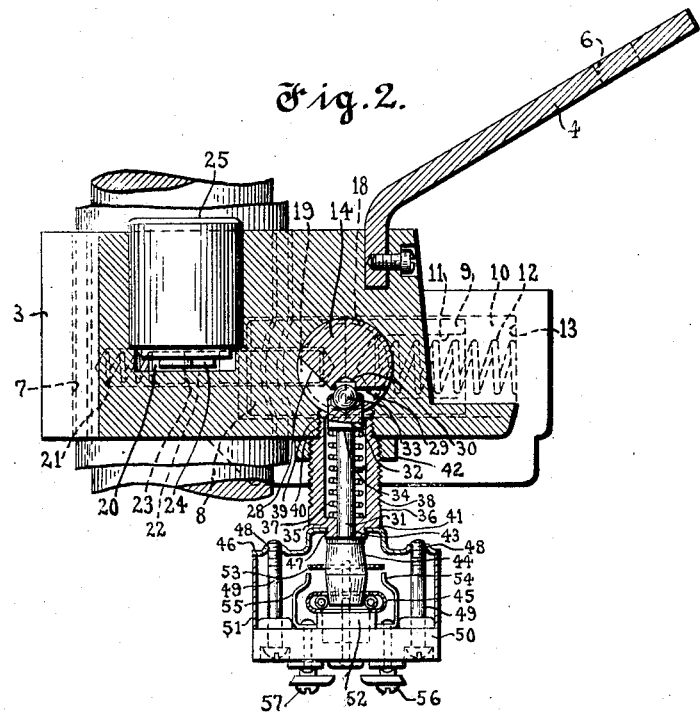

Referring to the accompanying drawing, in which I have shown a preferred embodiment of the invention, Figure 1 is a top plan view of the device, and Fig. 2 is a vertical sectional view of the device, taken on the line 2—2 of Fig. 1.

In the drawing the numeral 3 designates a metal casting or other suitable member for supporting the various parts in cooperative relation. Connected with the member 3 in any suitable manner is a plate 4, said plate extending upwardly at an angle and being provided with suitable openings 5 and 6 for attachment of said plate to the dashboard or other part of an automobile.

The member 3 is provided with an opening 7 to receive the shaft or column of an automobile steering gear, said shaft being provided with a notch or depression into which a bolt 8 is adapted to extend to lock the shaft against rotation. Bolt 8 is provided with an enlarged portion 9 adapted to slide within a cavity 10 in the member 3. The portion 9 of bolt 8 is provided with a counterbore 11 to receive a spring 12, said spring engaging the rear wall 13 of cavity 10 and normally tending to project the bolt 8 outwardly into a relation to lock the steering shaft against rotation. Outward movement of bolt 8 is limited by means of shaft 14 extending at a right angle thereto. The inner end of shaft 14 is cut away to provide a flat face 15 for engagement with the flat face 16 of the enlarged portion of bolt 8. The engaging faces 15 and 16 provide a cam action, whereby upon counter-clockwise rotation of shaft 14 by means of a suitable handle 17 the bolt 8 will be retracted or withdrawn from locking position against the action of spring 12.

Shaft 14 is provided intermediate the ends thereof with an annular groove 18 and a depression or counterbore 19 adapted to receive a bolt 20. Bolt 20 is adapted to be projected into depression 19 by spring 21 to lock the several parts of the device when the same are in the respective positions illustrated in the drawing, said bolt being provided with a reduced portion 22 to provide a shoulder 23 for engagement with a latch 24 on a lock 25. Upon insertion of the proper key into opening 26 in lock 25 latch 24 may be rotated in a counter-clockwise direction to engage bolt 20 and retract the same against the action of spring 21, whereupon shaft 14 may be rotated in a counter-clockwise direction by handle 17 to retract bolt 8 and thus unlock the steering gear.

Also intermediate the ends of shaft 14 is a cut-away portion 27 forming cam surfaces 28 and 29, (Fig. 2), surface 29 being provided with a depression or counterbore 30 adapted to receive the end of a rod 31, said end preferably being enlarged as indicated at 32 and having a ball bearing or other suitable anti-friction device 33 thereon. Said enlarged end 32 provides a shoulder 34 between which and an abutment 35 of a tubular member 36 a coil spring 37 is mounted. Said member 36 is externally screw-threaded as indicated at 38 and is further provided with a reduced screw-threaded portion 39 adapted to be screwed into a corresponding opening 40 in the member 3, a plurality of flat faces 41 being provided on the member 36 for engagement by a wrench. A nut 42 is provided for the threaded portion 38 whereby the threaded portion 39 may be locked in the desired position.

Rod 31 extends downwardly through a reduced opening 43 in the member 36 and is provided with a double conical member 44 adapted for movement through an annular member 45 which is of U-shape in cross section, said member enclosing an annular coil spring, as shown. A plate member 46 is rigidly connected to the tubular member 36 in any suitable manner, as by spinning or turning the annular projection 47 of the latter over the former. Member 46 is provided with a pair of screw-threaded openings 48 adapted to receive screws 49 extending upwardly from an insulating base 50, an enclosing and spacing member 51 being interposed between member 46 and base 50. A hollow projection 52 on base 50 provides a stop for limiting the downward movement of annular member 45, while permitting the member 44 to pass thereinto. An insulating plate 53 having an opening therethrough is also provided to limit the upward movement of member 45, said plate being provided with suitable tongues or projections at the opposite ends thereof (not shown) to enter corresponding openings in the walls of spacing member 51 to hold said plate in position.

In its extreme upper position the annular member 45 is adapted to bridge contact fingers 54 and 55, said contact fingers being connected in the usual manner to binding posts 56 and 57, whereas in its extreme lower position the member 45 is adapted to break the circuit between said contact fingers.

The double-conical switch operating means is of the general type disclosed in the patent to C. J. Klein, No. 1,306,852, dated June 17, 1919.

The operation of the device is as follows: Assuming the the parts to be in the respective position illustrated, in which the steering shaft is locked against rotation and the ignition circuit broken; by inserting a key in the lock 25 and turning the same in a counter-clockwise direction bolt 20 will be retracted, whereupon shaft 14 may also be rotated in a counter-clockwise direction to retract bolt 8 against the action of spring 12 and thus permit free movement of the steering shaft. Rotation of shaft 14 also effects depression of rod 31 against the action of spring 37, the arrangement of cam surface 28 being such that upon substantially complete retraction of bolt 8 the ridge or peak 44$^a$ passes beyond the longitudinal center of the coil spring within member 45 and the latter snaps into engagement with contact fingers 54 and 55 to close the ignition circuit.

To again lock the steering shaft and break the ignition circuit shaft 14 is rotated by means of handle 17 toward the position shown in the drawing, cam surface 28 permitting gradual upward movement of rod 31 by spring 37. Cam surface 29 then permits further upward movement of said rod, and as the depression 30 comes into register with ball bearing 33 the ridge or peak 44$^a$ is carried upwardly beyond the longitudinal center of the spring within member 45, and the latter rides downwardly over the lower cone member 44 out of engagement with contact fingers 54 and 55 to open the ignition circuit. At the same time bolt 20 is automatically projected into depression 19 to lock the several parts against reverse movement.

By the arrangement aforedescribed I have provided a combined lock for the steering shaft and ignition switch wherein a definite sequence and time relation of the several locking and unlocking operations is insured. Thus the ignition circuit will not be broken until shaft 14 has been turned to substantially the position illustrated, thereby tending to insure locking of the steering shaft upon locking of the ignition switch in open position. The cam operating means for the ignition switch provides for a given amount of movement of shaft 14 during locking or unlocking of the steering shaft without affecting the position of said switch, thus compensating for inaccuracies in manufacture which would otherwise affect the calibration of the several parts with respect to each other. As will be apparent, the cam surfaces 28 and 29 may be so formed as to effect opening or closing of the ignition circuit at any desired point with respect to the operation of unlocking or locking the steering shaft. Moreover, the cam surface 28 may lead directly to the counterbore 30, thus obviating the necessity of providing the cam surface 29.

In practice a spring-projected manually-releasable latch may be provided for engagement with suitable means on the shaft 14 to hold the same in the desired position upon completion of the counter-clockwise movement.

What I claim as new and desire to secure by Letters Patent is:

1. The combination with a latch movable into and out of locking engagement with a steering column, of a switch adapted upon given movement of a part thereof in opposite directions respectively to make and break an ignition circuit, said make and break being effected with a snap action, and common operating means for said latch and said switch comprising a member having a plurality of cam surfaces adapted upon given movement thereof to effect proportionate movement of said latch and disproportionate movement of said switch part, said movements of said parts being correlated to insure locking positioning of said latch prior to breaking of said ignition circuit.

2. The combination with a latch movable into and out of locking position with respect to an automobile steering column of an ignition switch adapted to snap into and out of circuit making position, and common operating means including a plurality of cam surfaces for effecting movement of said switch out of circuit making position only upon substantially full locking positioning of said latch and for effecting movement of said switch to circuit making position only upon substantially full unlocking positioning of said latch.

3. The combination with a latch movable into and out of locking position with respect to a steering column, of a switch for the ignition circuit adapted to snap into and out of circuit making position, common operating means for said latch and said switch arranged to effect a relatively large movement of said latch prior to operation of said switch while insuring operation of said latch and switch in predetermined sequence, said means including a member having cam surfaces for engagement with said latch and said switch, and automatically operable locking means for said latch.

4. The combination with a switch movable to circuit making and breaking positions with a snap action upon predetermined movement of an element thereof in opposite directions respectively, and operating means therefor comprising a member having a cam surface adapted upon movement thereof at a uniform rate to effect a non-uniform rate of movement of said element.

In witness whereof, I have hereunto subscribed my name.

GEORGE J. MEUER.